No. 857,054. PATENTED JUNE 18, 1907.
C. M. HAESKE.
SEAT SPRING.
APPLICATION FILED JAN. 2, 1906.

Charles M. Haeske
Inventor

Witnesses

By James DuShane
Attorney

UNITED STATES PATENT OFFICE.

CHARLES M. HAESKE, OF SOUTH BEND, INDIANA.

SEAT-SPRING.

No. 857,054.  Specification of Letters Patent.  Patented June 18, 1907.

Application filed January 2, 1906. Serial No. 294,138.

*To all whom it may concern:*

Be it known that I, CHARLES M. HAESKE, a citizen of the United States, residing at South Bend, in the county of St. Joseph and State of Indiana, have invented certain new and useful Improvements in Seat-Springs, of which the following is a specification.

This invention relates to improvements in seat springs for wagons, and has for its object the prevention of rattling at the ends of such springs due to wear as well as to facilitate the assembling of such springs and thus cheapen their cost as will hereinafter be more fully described, and illustrated in the accompanying drawings.

Similar parts are designated by the same letters throughout.

Figure 1:
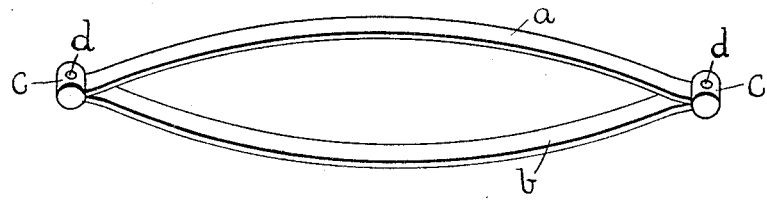
Figure 2:
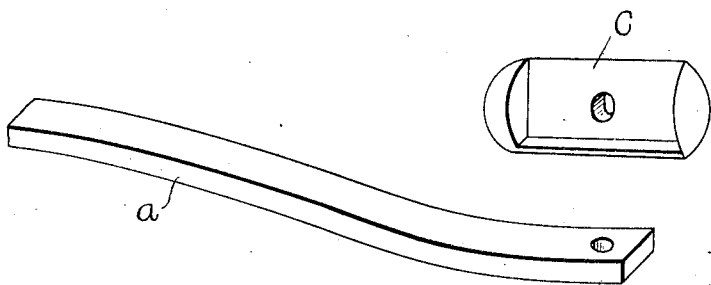
Figure 3:
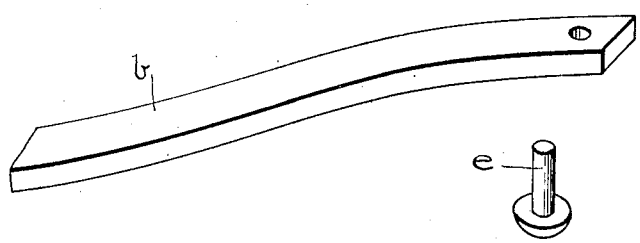
Figure 3:
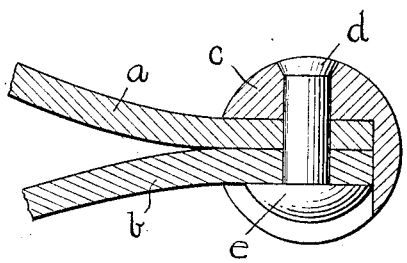

Figure 1, is an isometric view of the spring with its parts assembled. Fig. 2 is a perspective view of the end portion of the spring showing the parts separated, and Fig. 3 is a vertical sectional view of the end portion of the spring showing the end parts connected together.

The construction of the spring is as follows: The two leaves, A and B, are perforated at the ends as shown in Fig. 3. They are then brought together in the recess of socket C and then a bolt E is passed through the alined holes in the leaves and the socket and the whole is firmly and securely riveted together as shown in Fig. 3. The completed spring is shown in Fig. 1. It will be seen from this construction that during the expansion of the spring no strain whatever is placed upon the socket which serves as a housing for the ends and which secures the leaves from lateral displacement. The elasticity of the springs acts from their line of contact and as the leaves are held firmly in contact with each other there can be no rattle to the spring, however rough the road may be over which the vehicle may be driven. The assembling of the parts as is evident is greatly facilitated by this construction, which produces a reliable spring at a reduced cost.

Having thus described my invention, what I claim and desire to secure by Letters-Patent is as follows:

A spring comprising leaves having their ends bearing laterally against each other, a socket having circular ends and a semi-cylindrical intermediate portion with rectangularly disposed under surfaces, the ends of said leaves squarely abutting against one of said rectangularly-disposed surfaces, and a rivet passing through both of the ends of said leaves and the intermediate portion of said socket and fixing the ends to the other rectangularly-disposed surface.

In testimony whereof I affix my signature in presence of two witnesses.

CHARLES M. HAESKE.

Witnesses:
  L. E. KLINGHAMMER,
  S. E. BABCOCK.